US011617365B2

(12) United States Patent
Arav

(10) Patent No.: US 11,617,365 B2
(45) Date of Patent: Apr. 4, 2023

(54) DEVICES AND METHODS FOR PREPARATION OF A BIOLOGICAL SAMPLE FOR A CRYOPROCEDURE

(71) Applicant: FertileSafe Ltd, Ness Tziona (IL)

(72) Inventor: Amir Arav, Ness Tziona (IL)

(73) Assignee: FERTILESAFE LTD., Ness Tziona (IL)

( * ) Notice: Subject to any disclaimer, the term of this patent is extended or adjusted under 35 U.S.C. 154(b) by 828 days.

(21) Appl. No.: 15/934,803

(22) Filed: Mar. 23, 2018

(65) Prior Publication Data
US 2018/0206481 A1 Jul. 26, 2018

Related U.S. Application Data

(63) Continuation-in-part of application No. 15/761,073, filed as application No. PCT/IL2016/051115 on Oct. 13, 2016.

(60) Provisional application No. 62/481,501, filed on Apr. 4, 2017, provisional application No. 62/358,045, filed on Jul. 3, 2016, provisional application No. 62/240,646, filed on Oct. 13, 2015.

(51) Int. Cl.
*A01N 1/02* (2006.01)

(52) U.S. Cl.
CPC ......... *A01N 1/0268* (2013.01); *A01N 1/0221* (2013.01); *A01N 1/0242* (2013.01); *A01N 1/0252* (2013.01)

(58) Field of Classification Search
None
See application file for complete search history.

(56) References Cited

U.S. PATENT DOCUMENTS

| 3,995,496 A | 12/1976 | Bickford |
| 5,217,693 A | 6/1993 | Anderson et al. |
| 6,117,394 A | 9/2000 | Smith |
| 2004/0177390 A1* | 9/2004 | Lewis ................. C12N 15/873 800/8 |

(Continued)

FOREIGN PATENT DOCUMENTS

| CA | 2897219 A1 | 7/2014 |
| CN | 101779623 | 2/2012 |

(Continued)

OTHER PUBLICATIONS

PCT Search Report for PCT Application PCT/IL2017/05044 dated May 21, 2017.

(Continued)

*Primary Examiner* — William H. Beisner
(74) *Attorney, Agent, or Firm* — The Roy Gross Law Firm, LLC; Roy Gross

(57) ABSTRACT

A device for retaining a biological sample for performing a cryoprocedure on a biological sample having a tubular member having a lumen extending therein, the lumen configured to receive the biological sample. A retainer is couplable to a distal end of the tubular member, the retainer having a perforated member having at least one orifice, the at least one orifice having a dimension smaller than a dimension of the at least one biological sample to prevent exit of the biological sample from the tubular member, wherein the perforated element is configured to allow inflow of liquids to communicate with the lumen containing the biological sample.

4 Claims, 12 Drawing Sheets

(56) References Cited

U.S. PATENT DOCUMENTS

| | | | |
|---|---|---|---|
| 2006/0046243 | A1 | 3/2006 | Stachecki et al. |
| 2011/0207112 | A1 | 8/2011 | Burbank et al. |
| 2013/0137080 | A1 | 5/2013 | Henderson et al. |
| 2013/0260452 | A1* | 10/2013 | Toner .............. G01N 1/42 435/307.1 |
| 2014/0158695 | A1 | 6/2014 | Jimenez-Rios |
| 2014/0342454 | A1* | 11/2014 | Burbank .......... C12M 45/00 435/374 |
| 2015/0011000 | A1 | 1/2015 | Stojanov |
| 2016/0029619 | A1 | 2/2016 | Sun et al. |

FOREIGN PATENT DOCUMENTS

| | | |
|---|---|---|
| EP | 2706342 | 3/2014 |
| WO | WO 99/09137 A1 | 2/1999 |
| WO | WO 99/011121 | 11/1999 |
| WO | WO 01/78504 A2 | 10/2001 |
| WO | WO 2008/011070 A2 | 1/2008 |
| WO | WO 2013/098825 | 7/2013 |
| WO | WO 2014/088514 | 6/2014 |
| WO | WO 2014/106286 | 7/2014 |
| WO | WO 2014/186531 | 11/2014 |
| WO | WO/2014/088514 | 12/2014 |
| WO | WO 2015/191570 | 12/2015 |
| WO | WO 2016/087873 A2 | 6/2016 |
| WO | WO 2017/064715 | 4/2017 |
| WO | WO 2017/122210 | 7/2017 |

OTHER PUBLICATIONS

PCT Search Report for PCT Application PCT/IL/2016/051115 dated Apr. 26, 2018.

PCT Search Report for PCT Application PCT/IB2017/000465 dated Feb. 14, 2019.

"Vitrification of human ICSI/IVF spermatozoa without cryoprotectants: new capillary technology." Journal of andrology 33.3 Isachenko, V., et al. Dec. 31, 2012 (Dec. 31, 2012).

U.S. Office Action of U.S. Appl. No. 15/761,073 dated Apr. 23, 2021.

United States Patent and Trademark Office Non-Final Office Action for U.S. Appl. No. 15/761,073 dated Nov. 9, 2022, 12 pp.

* cited by examiner

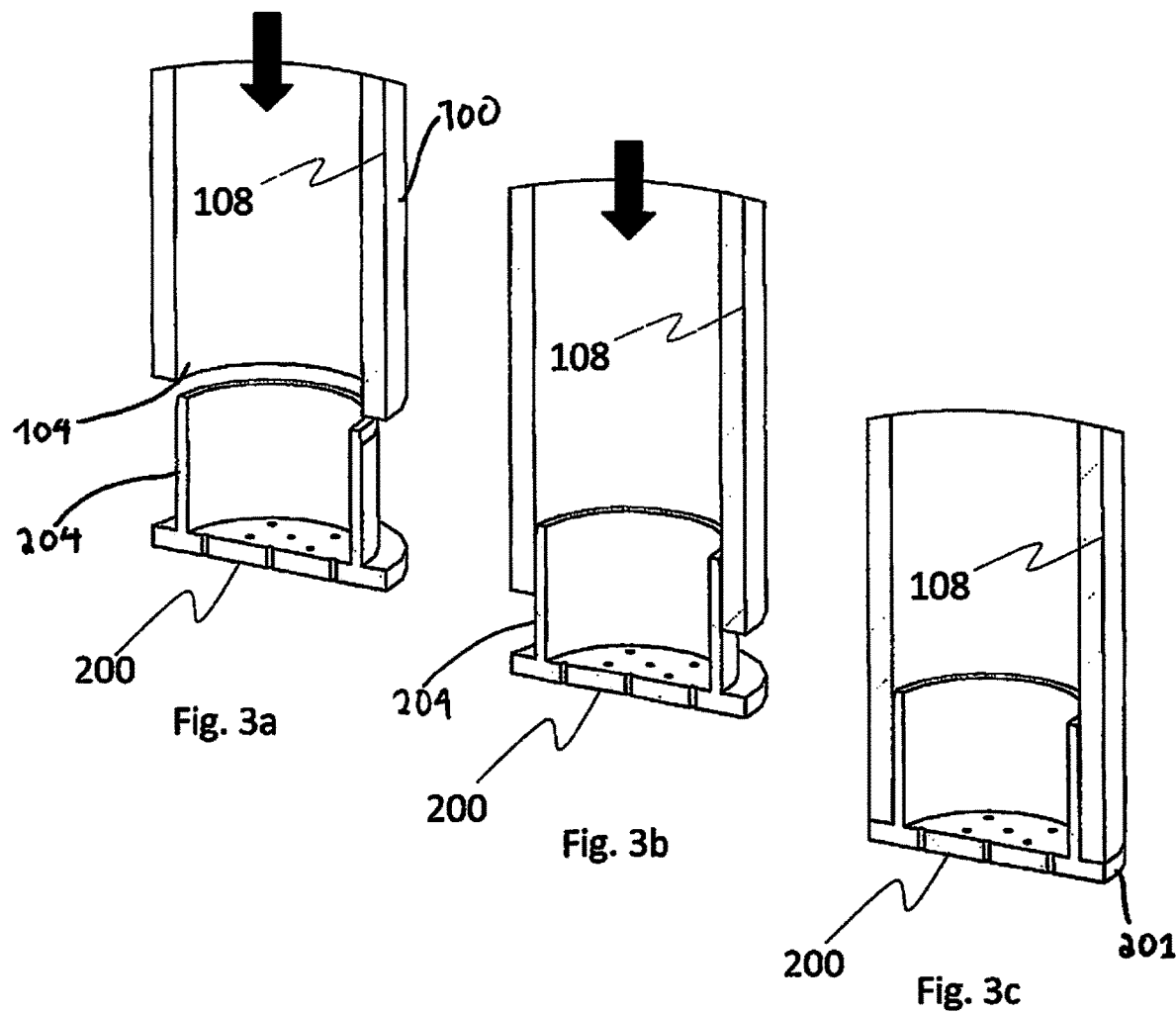

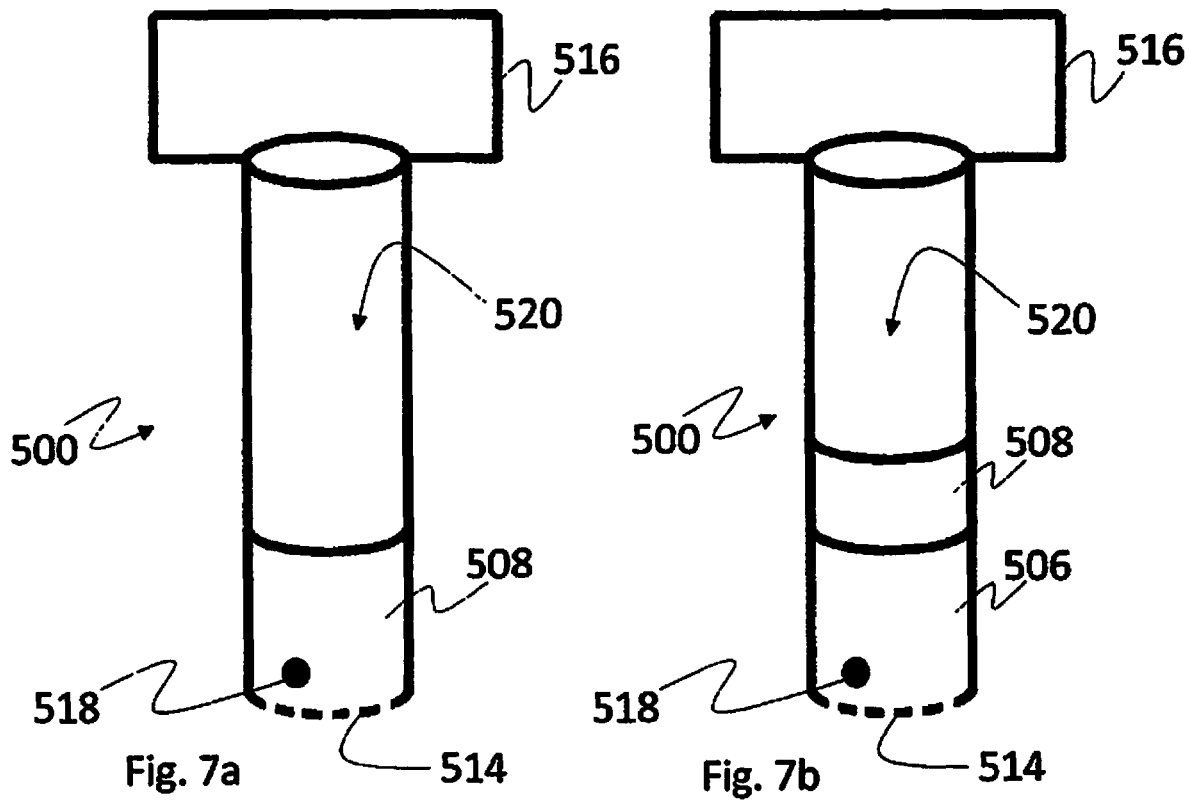
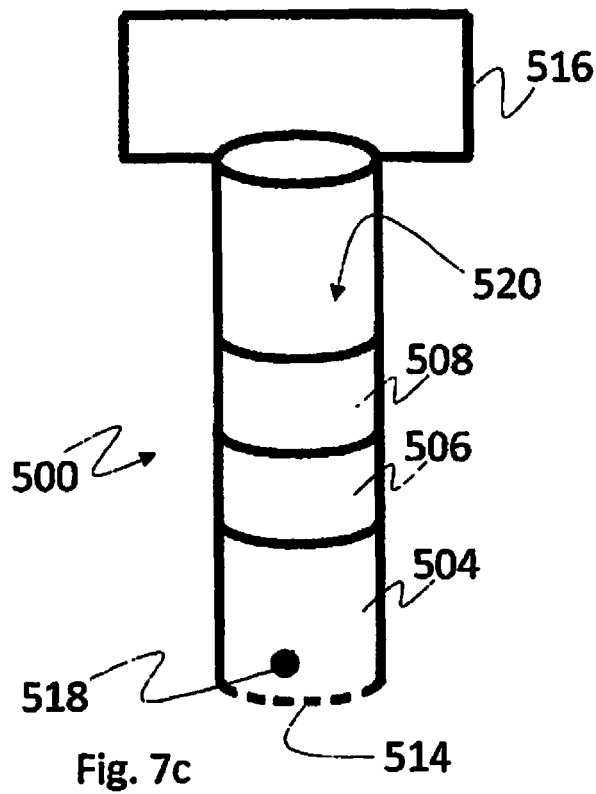

DEVICES AND METHODS FOR PREPARATION OF A BIOLOGICAL SAMPLE FOR A CRYOPROCEDURE

This application claims priority from provisional application Ser. No. 62/481,501, filed Apr. 4, 2017, and is a continuation in part of application Ser. No. 15/761,073, filed Mar. 16, 2018, which is a 371 of PCT/IL2016/051115, filed Oct. 13, 2016, which claims priority from provisional application Ser. No. 62/240,646, filed Oct. 13, 2015, and from provisional application Ser. No. 62/358,045, filed Jul. 3, 2016. The entire contents of each of these applications are incorporated herein by reference.

BACKGROUND

Technical Field

This application generally relates to devices for micromanipulation of biological samples, and more specifically, for vitrification, culturing, cryopreservation, thawing and/or warming of biological samples and methods for using the devices.

Background of Related Art

Preservation of biological samples, for example oocytes and embryos at very low temperature, is known as cryopreservation. One of the major challenges of cryopreservation is to prevent the intracellular liquid within the sample from turning into ice crystals. Two common techniques of cryopreservation are slow freezing and vitrification.

During the slow freezing process ice crystals are formed intercellularly, and as a result the remaining liquid becomes hypertonic thus allowing intracellular water to leave the cells and to pass towards an outside of the cells by exosmosis, thus preventing intracellular crystallization.

In vitrification, intercellular and intracellular water crystallization is avoided by means of a very high cooling rate. According to some vitrification protocols, the sample is plunged into a very cold cryogenic medium, e.g., liquid nitrogen (LN) or LN slush, thus resulting in very high cooling rates, which enables vitrification rather than crystallization of the intracellular and intercellular liquids.

In some protocols, vitrification may be further enabled by increasing the viscosity of the sample, for example by applying various cryoprotectants and/or other applicable additives, by reducing the volume of the sample, or by a combination thereof. For example, the publication "Vitrification of oocytes and embryos" (Amir Arav, "Embryonic development and manipulation in animal development", edited by A. Lauria and F. Gandolfi, Portland Press, London, U.K., 1992) discloses a method of vitrifying cells enclosed in small drops sufficient to keep them in physiological conditions. In this publication, Arav reports that with volume of 70 nanoliter drops, good survival rates can be achieved even with low concentration of cryoprotectant.

Vitrification is further described in the following publications:

"Titration of Vitrification Solution in Mouse Embryo Cryopreservation" (A. ARAV, L. GIANAROLI, AND P. SURIANO, Cryobiology 25(6), 1988) discloses reducing the toxicity of the vitrification solution by decreasing the time and temperature of embryo exposure to cryoprotectant solution.

"Osmotic and cytotoxic study of vitrification of immature bovine oocytes" (A. Arav, D. Shehu, and M. Mattioli, Journal of Reproduction and Fertility, 99: 353-358, 1993) discloses experiments conducted in order to determine the composition of a solution suitable for vitrification of immature bovine oocytes.

"New trends in gamete's cryopreservation" (Amir Arav, Saar Yavin, Yoel Zeron, Dity Natan, Izik Dekel, and Haim Gacitua. Molecular and Cellular Endocrinology, 187: 77-81, 2002) discloses techniques to improve freezing and vitrification of sperm, oocytes and embryos, based on 'Multi-Thermal-Gradient' (MTG) freezing.

"Measurement of essential physical properties of vitrification solutions" (S. Yavin and A. Arav. Theriogenology, 67(1): 81-9, 2007) examines the principal parameters associated with successful vitrification, and composes guidelines to aspects of the vitrification process.

"Embryo cryopreservation in the presence of low concentration of vitrification solution with sealed pulled straws in liquid nitrogen slush" (Saar Yavin, Adaya Aroyo, Zvi Roth, and Amir Arav. Human Reproduction, 24(4): 797-804, 2009) presents a vitrification method that combines LN slush and sealed pulled straws (SPS).

U.S. Patent Publication 2011/0207112 (Burbank and Jones, published in 2011) discloses an automated system and method of cryopreservation and reanimation of oocytes, embryos, or blastocysts. One or more oocytes or embryos are positioned in a processing container, the processing container being configured to allow fluid to flow into and out of the processing container, where two or more fluids flow into and out of the processing container with oocytes or embryos therein.

PCT publication WO/2014/088514 (NG and Vajta, published in 2014) relates to a method of producing at least one vitrified cell comprising loading a cell into a holding space in at least one conduit; providing at least one cryoprotectant to the holding space of the conduit in increasing concentrations, wherein the cryoprotectant is capable of equilibrating the cell; cooling the cell in the holding space of the conduit to produce a vitrified cell; and storing and maintaining the vitrified cell in the holding space of the conduit.

Known cryopreservation procedures and methods are time consuming. Requirements of additional time add to the cost of preservation and the procedure. Faster cryopreservation methods also reduce the risk of osmotic shock. Additionally, current cryopreservation procedures and methods have limited volumes/sample capabilities. For example, in current systems the sample, e.g. eggs, are moved one by one into various solutions for cryopreservation. This limits the number of samples and can add to the complexity of the procedure. It would be advantageous to provide a system which not only simplifies the procedure, but speeds the process of cryopreservation and enables a greater number of samples to be preserved in a shorter period of time. It would further be advantageous to include automation during cryopreservation to standardize the procedure and thereby increase consistency of the clinical results.

SUMMARY OF THE INVENTION

The present invention provides a system and method for cryopreservation of biological samples in a quick and efficient way enabling preservation of a relatively large number of samples.

In accordance in one aspect of the present invention, a device is provided for retaining a biological sample for performing a cryoprocedure on the biological sample, the device comprising a tubular member (also referred to as a straw) having a lumen extending therein configured to receive the biological sample and a retainer (also referred to as a basket) couplable to a distal end of the tubular member, the retainer having a perforated member having at least one orifice. The at least one orifice has a dimension smaller than a dimension of the at least one biological sample to prevent exit of the biological sample from the tubular member, wherein the perforated member is configured to allow inflow of liquids to communicate with the lumen containing the biological sample.

In some embodiments, the tubular member forms a capillary duct to draw the biological sample into the tubular member. In some embodiments, a separate component is couplable to the tubular member after the biological sample is within the tubular member. In some embodiments, the retainer and tubular member are couplable by a frictional fit. In some embodiments, the retainer has a first shrinking coefficient and the tubular member has a second shrinking coefficient to provide a pressure fit upon a change in temperature. In some embodiments, the tubular member includes a pump disposed at a proximal end.

In some embodiments, the retainer has a circumferential wall inserted into the distal end of the tubular member; in other embodiments the distal end of the tubular member is inserted into a space within circumferential wall.

In some embodiments, the perforated element comprises a mesh.

In accordance with another aspect of the present invention, a device for retaining multiple biological samples for a cryoprocedure is provided, the device including a tubular member having a lumen configured to receive a plurality of biological samples and a restrictor (basket) at a distal end configured to prevent exiting of the biological samples from the tubular member while enabling inflow of fluid to contact biological samples. The restrictor has a base and a wall extending therefrom.

In some embodiments, the restrictor comprises a member having a plurality of orifices, the orifice having a dimension smaller than a dimension of the biological samples. In some embodiments, the tubular member forms a capillary duct to draw the biological samples in a proximal direction through the restrictor and into the tubular member. In some embodiments, the restrictor is positioned within a second member couplable to the tubular member after the biological samples are positioned in the lumen of the tubular member.

In accordance with another aspect of the present invention, a method for performing a cryoprocedure on a biological sample is provided comprising:
 a) loading the biological sample into a tubular member;
 b) positioning the tubular member in a first solution with the biological sample retained therein;
 c) removing the tubular member from the first solution with the biological sample retained therein; and
 d) positioning the tubular member in a second solution with the biological sample retained therein.

In some embodiments, the step of loading the biological sample is performed by capillary action. In some embodiments, the step of loading the biological sample is performed by pumping-in the biological sample. The first and second solutions can have different densities.

In some embodiments, a plurality of biological samples are loaded into the tubular member and the plurality of biological samples are together positioned in the solutions.

In some embodiments, the sample is retained by a perforated element, the perforated element having at least one orifice having a dimension smaller than a dimension of the biological sample to prevent exit of the biological sample from the tubular member, wherein the perforated element is configured to allow inflow of liquids to communicate with the lumen containing the biological sample. In some embodiments, the perforated element is positioned in a holding member, and the holding member is couplable to the tubular member.

The present invention also provides in another aspect a device configured to perform a cryoprocedure on at least one biological sample comprising a straw comprising a straw space, configured to draw liquid from a distal end of the straw space towards a proximal end of the straw space and a pod coupled to a distal end of the straw. The pod includes a holding space and a perforated member comprising at least one orifice whose diameter is smaller than the diameter of the at least one biological sample, wherein the perforated element is configured to allow inflow of liquids into the preparation space and outflow of liquids from the preparation space. The holding space is configured to form, together with the straw space, a preparation space wherein the at least one biological sample can undergo the cryoprocedure.

The at least one orifice can have a circular cross section, a square cross-section or other shapes. In some embodiments, a pump can be coupled to a proximal end of the straw. In some embodiments, the straw is a capillary duct and the straw space is a capillary space.

In accordance with another aspect of the present invention, a pod is provided couplable to a straw that is configured for performing a cryoprocedure on at least one biological sample, the pod comprising a holding space configured to form, upon coupling with the straw, a preparation space together with a straw space and a perforated member comprising at least one orifice whose diameter is smaller than the diameter of the at least one biological sample, wherein the perforated element is configured to allow inflow of liquids used for the cryoprocedure into the holding space and outflow of liquids from the holding space.

In accordance with another aspect of the present invention, there is provided a method for performing a cryoprocedure on at least one biological sample in a straw, comprising:
 loading the at least one biological sample into a straw;
 exposing the at least one sample in the straw to solutions with gradually changing densities, while preventing the at least one sample from flowing out of the straw.

In some embodiments, the loading of the at least one biological sample is performed by capillary action. In other embodiments, the loading of the at least one biological sample is performed by pumping-in the at least one sample. In other embodiments, the loading of the at least one biological sample is performed by utilizing the communicating vessels concept.

In some embodiments, the step of exposing the at least one biological sample is performed by replacing solutions in the straw, in other embodiments by capillary action and in other embodiments by loading layers of gradually changing solutions into the straw.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2b is a cutaway view of the pod of FIG. 2a;

FIGS. 3a, 3b and 3c are perspective views illustrating the coupling of the pod of FIG. 2a with the tube of FIG. 1, both the pod and tube shown in a cutaway view;

FIGS. 7a, 7b and 7c illustrate stages of loading the tube of FIG. 5 in accordance with the procedures (method) of FIG. 6.

DETAILED DESCRIPTION

Figure 1:
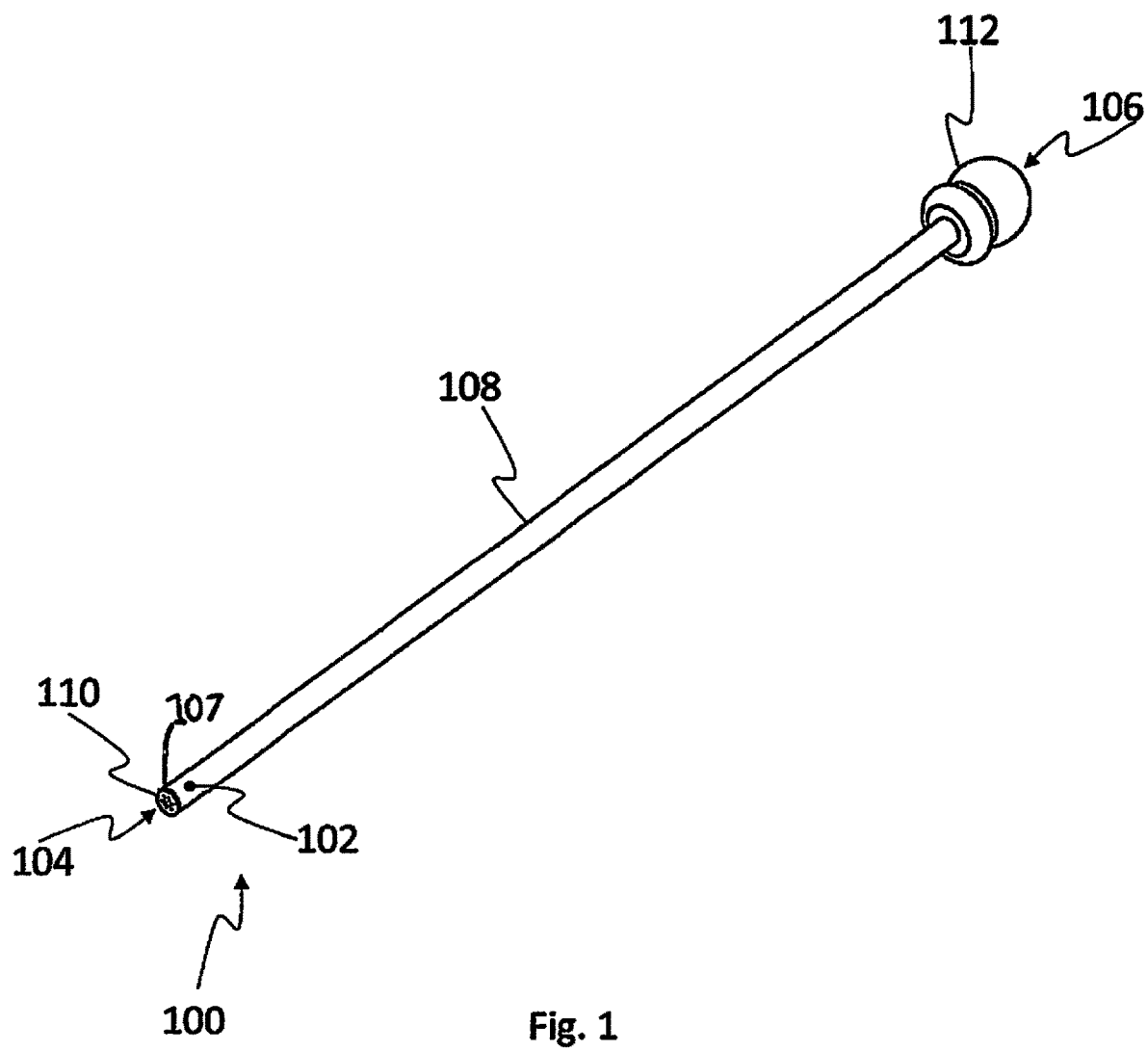
FIG. 1 is a perspective view of one embodiment of a tube (e.g., capillary device) of the present invention configured to apply cryoprocedures to a biological sample and further having a pod fully inserted into the tube.
Figure 2A:
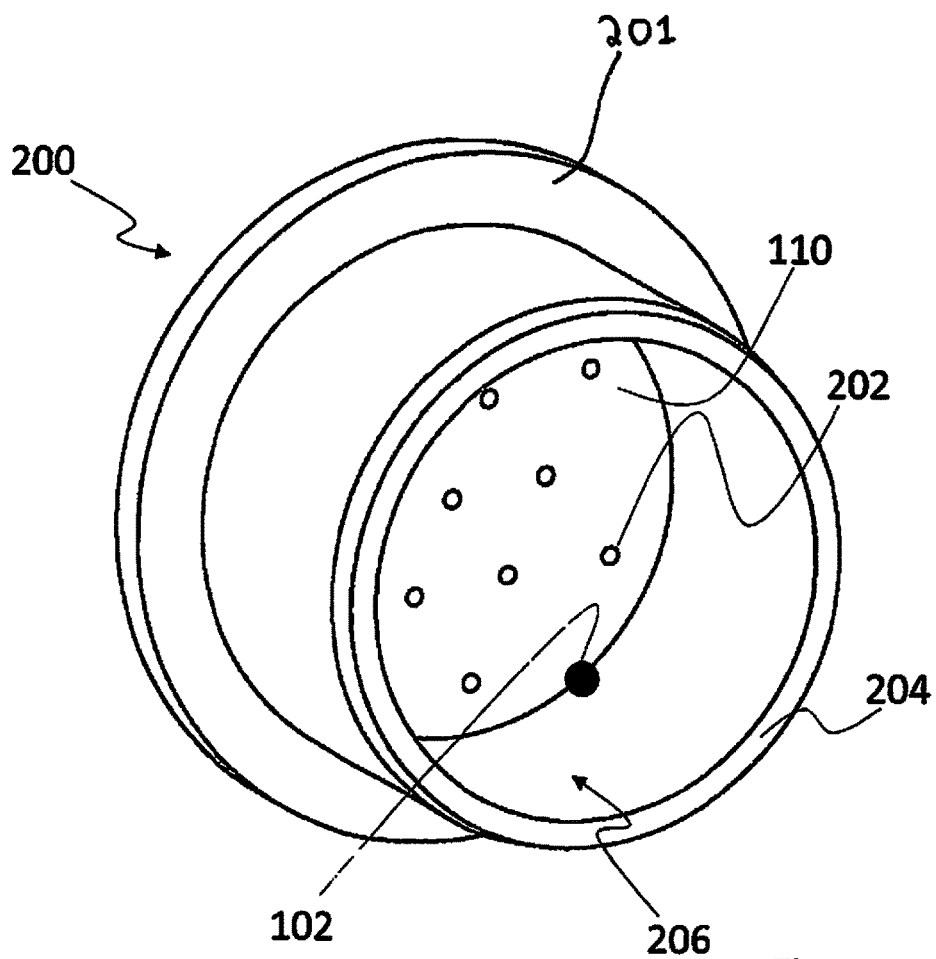
FIG. 2a is a perspective view of one embodiment of a pod of the present invention, shown prior to attachment to a tube.

Referring now in detail to the drawings wherein like reference numerals identify similar or like components throughout the several views, an embodiment of the tube is designated by reference numeral 100 in FIG. 1 and an embodiment of the pod (capsule) is designated by reference numeral 200 in FIG. 2a. These two components are coupled together as described in detail below to retain the biological sample within the tube. Note that FIG. 1 illustrates one exemplary embodiment of the tube of the present invention and FIG. 2a illustrates one exemplary embodiment of the pod of the present invention, as other configurations are also contemplated as will become apparent from the discussion below.

In addition, unless specifically noted otherwise, embodiments described or referenced in the present description can be additional and/or alternative to any other embodiment described or referenced therein.

The components/system of the invention described herein are configured to vitrify at least one biological sample, i.e., either a single sample or multiple samples. However, for simplicity the system described herein refers to "a sample". It should be understood, that unless specifically noted otherwise, whenever "a sample" is used the same also applies to "at least one sample". Similarly, whenever reference is made to "the sample", the same should apply to "the at least one sample" as well. Thus, the system can be used to vitrify one or more samples within the tube, with only one shown in the drawings for ease of understanding.

Turning now to FIG. 1, a perspective view of one embodiment of a tube 100 of the present invention is illustrated. Tube 100, also referred to herein as a straw, is in one embodiment a capillary device configured to apply cryoprocedures to a biological sample 102 contained within the tube 100. Capillary device 100 may be composed of transparent, translucent and/or opaque members. Accordingly, biological sample 102 that resides inside the capillary device 100 may be visible from outside the device 100, or alternatively, not visible from the outside. In FIG. 1, the tube 100 is transparent so the biological sample 102 is visible. This aids explanation of the invention.

The tube (capillary device) 100, also referred to herein a tubular member or straw, has a lumen formed therein forming a capillary duct 108 extending from a proximal end 106 to a distal end 104 of the device 100. At the distal end 104, a perforated element (member) 110 is illustrated. This perforated element 110 is part of the pod which is inserted into the tube 100 and discussed in detail below. Note that the perforated element 110 in this embodiment is retained by a pod that fully sits within the tube 100 so it is positioned at the distalmost portion substantially flush with the distal edge 107 of the tube 100. Alternatively, it can be positioned slightly proximal of the edge 107 so it is positioned more inside the tube. Alternatively, it could extend slightly distally of the distal edge if the pod on which it is retained projects slightly distally of the edge 107. In any event, the perforated element 210 functions to allow inflow of liquid and prevent exit of the biological sample 102 from the tube 100. Note in the embodiment of FIG. 1, the pod does not have a flange as in FIG. 2a so that the pod is fully inserted within the tube 100. At the proximal end of the tube 100, a manual pump 112 is provided. This manual pump 12 is utilized to pump liquid through the tube 100 which is described in more detail below. It should be appreciated that the manual pump 112 is optional and in some embodiments it is not provided. Moreover, while the pump illustrated in the figure is one type of manual pump that can be utilized, other manual pumps can also be utilized. Additionally, it should also be appreciated that in other embodiments, pumps other than manual pumps can be utilized to pump liquid such as an electrical pump. Thus, the present invention is not limited to the manual pump shown as other ways to pump liquid can be utilized. Note the pump can be used with the tube having a capillary duct as a supplement or used with a tube configured not to have a capillary duct. Inside the capillary device 100 there is lumen creating a free space therein, constituting a "capillary space". Similar to the capillary duct, the capillary space also has a distal end (at the capillary duct's distal end) and a proximal end (at the capillary duct's proximal end) as it extends along the length of the device 100, The tube 100 in some embodiments has a length ranging from about 100 mm to about 130 mm, however, other lengths are also contemplated The tube 100 in some embodiments has an outer diameter ranging from about 0.3 mm to about 6 mm and in some embodiments from about 1.5 mm to about 6 mm, and an inner diameter ranging from about 0.1 mm to about 5.8 mm and in some embodiments from about 1.5 mm to about 5.8 mm as the wall thickness can be about 0.2 mm. Note that these dimensions are provided by way of example and should not be considered as limiting as other dimensions (wall thickness, diameter, length, etc.) to achieve the functions of the tube described herein are also contemplated.

Cryoprocedures, with reference to some embodiments described herein, comprise culturing, vitrification, and/or cryopreservation. In some embodiments, a cryoprocedure may be any one of culturing, vitrification, freezing, lyophilization, and/or cryopreservation. In some embodiments, cryoprocedures may comprise vitrification and cryopreservation, with or without culturing. In some embodiments the systems of the present invention can be used for the procedures of thawing and/or warming after cryopreservation. The description herein generally refers to vitrification as an example of a cryoprocedure. However, it should be appreciated that other cryoprocedures can be utilized, e.g., any one of the cryoprocedures mentioned above. The devices/systems disclosed herein can also be used for procedures other than the foregoing.

The biological sample 102, also referred to as "sample", may be of an animal origin, including but not restricted to human beings, mammals, and vertebrates. In some cases, the biological sample may be a single cell sample, such as an oocyte or sperms, while in other cases, the biological sample may be a multi-cell suspension. In yet other cases, the biological sample may be a tissue, for example a piece of tissue, such as a slice of ovarian tissue or a slice of testicular tissue, an embryo, or others. In some cases, the invention is used for handling reproductive biological samples (such as oocytes and/or sperm and/or embryos and/or ovarian tissues and/or testicular tissue etc.). However, the invention is not limited to reproductive biological samples and embodiments thereof may be directed to other kinds of biological samples. One non limiting example for using the invention with other (non-reproductive) kinds of biological samples is preparing a piece of tissue taken in a biopsy for cryopreservation, before the piece is sent for analysis.

The biological sample can be loaded into the capillary space of the capillary duct of the tube (straw) using different methods. It is well known that capillarity (known also as capillary action or capillary motion) gives rise to the ability of a liquid to flow in narrow spaces without the assistance of, or even in opposition to, external forces such as gravity. Accordingly, the mass of the biological sample affects the ability to load it into the capillary duct by capillary action. For small biological samples the loading of the cells may take place via capillary action. For larger biological samples, loading may take place using a pump such as pump 112 of FIG. 1 to pump-in the sample. If applicable, a pump can be used also for loading small biological samples. It is known that the determination of a sample being small or large so as to allow or prevent its capillary loading is effected, e.g., by the radius of the capillary space, the mass of the liquid and the mass of the sample.

Figure 2B:
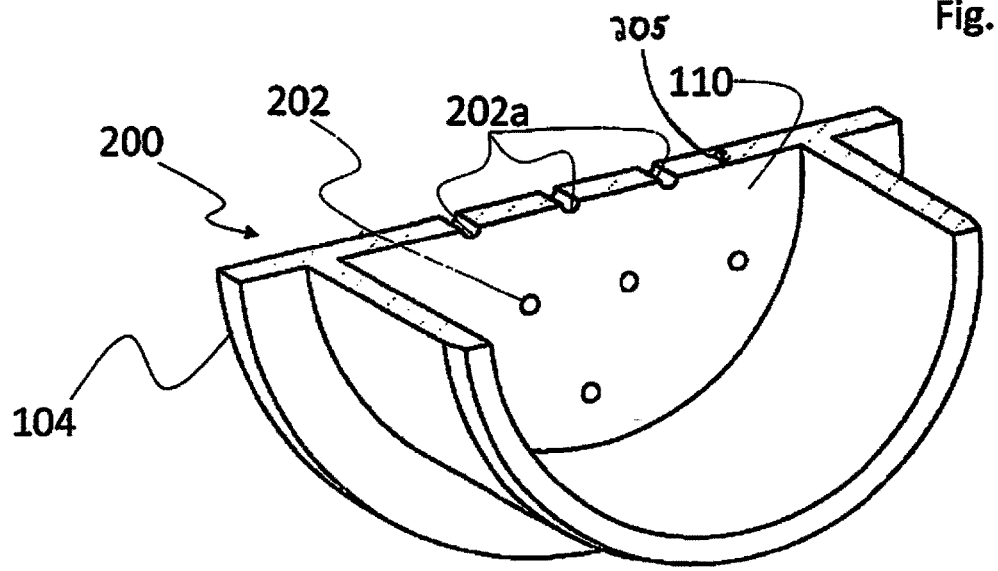

Turning now to the pod of the present invention, also referred to herein as a capsule, container, retainer, holding member, basket or retaining member/element, and with initial reference to FIG. 2a and FIG. 2b, the pod is designated generally by reference numeral 200. While in FIG. 2a the whole pod 200 is illustrated, FIG. 2b presents a cutaway view of the pod 200 (basket) to explain/illustrate features of the pod 200. Pod 200 includes a perforated element or portion 110 mounted therein. The perforated element 110 can be composed of a membrane or mesh material, although other materials are also contemplated to provide openings (orifices). The perforated element 110 has at least one orifice 202, and preferably a plurality of orifices, the diameter of each orifice being small enough to prevent the biological sample 102 from flowing (exiting) therethrough, i.e., the diameter (or transverse dimension) of the orifice is smaller than the diameter (or transverse dimension) of the biological sample 102, therefore functioning as a restriction or restricting element (restrictor) for the sample However, the diameter of the orifice is large enough to allow inflow of selected fluids. It should be understood that a biological sample flowing through an orifice actually outflows from the pod 200, and in most cases this means that the sample is lost. Therefore, the orifice diameter or dimension is provided to be less than the diameter or dimension of the sample. As can be appreciated, the use of the term "diameter" is used to describe the transverse dimension of the orifice and sample and is not limited to a circular dimension since the orifice or sample need not be circular. Therefore, the term diameter can be considered to denote a transverse dimension of the orifice or sample, e.g., a length across the opening. By keeping the transverse dimension of the orifice smaller than the sample, the sample is prevented from flowing through the orifice. In preferred embodiments, all of the orifices have such transverse dimensions smaller than the transverse dimension of the sample. For example, in some embodiments the diameter of an orifice 202 does not exceed 5 μm (micrometer) or 10 μm or 15 μm or 20 μm or 25 μm or 40 μm or 50 μm or 55 μm or 60 μm or 65 μm or 70 μm or 75 μm or 80 μm or 85 m or 90 μm or 95 μm or 100 μm or 120 μm or 140 μm or 150 μm or 160 μm or 180 μm or 200 μm or 250 μm or 300 μm or 350 μm or 400 μm or 450 μm or 500 μm or another diameter configured to be smaller than the diameter of the biological sample. Note these are provided by way of example as other dimensions are also contemplated. Also, the dimensions of the orifice can be selected to correspond to the type of biological sample, e.g., smaller samples requiring smaller orifices.

It should be appreciated that in preferred embodiments, multiple biological samples are contained within the tube 100 and are retained by the perforated element 110, however, only one sample is shown in the drawings for ease of illustration.

It is noted that "at least one orifice" covers the case wherein the perforated member comprises a single orifice, as well as those cases when the perforated member comprises multiple orifices. Also, although shown as round, the orifices can be other shapes, such as rectangular as shown for example in the embodiment of FIG. 2e described below.

Figure 2C:
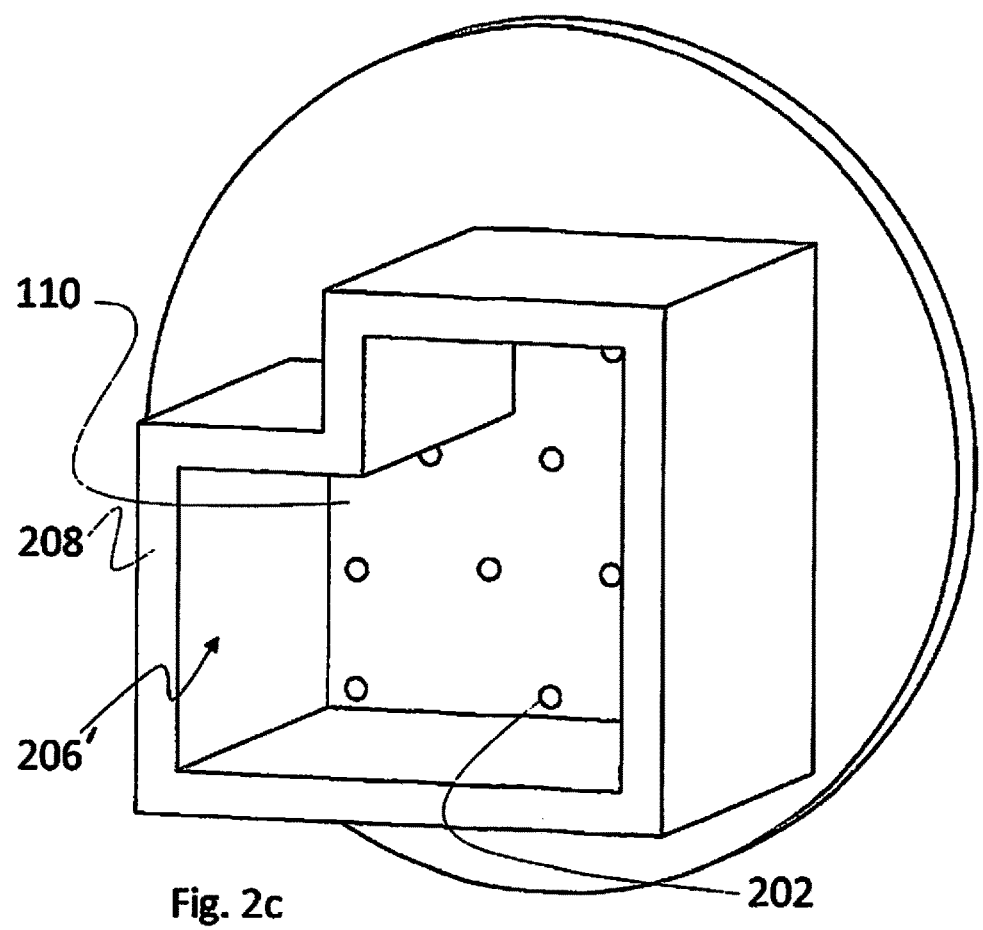
FIG. 2c is a perspective view of another alternate embodiment of a pod of the present invention having a circumferential wall with a polygonal cross section.

Pod 200 includes a flange or base 201 and a circumferential wall 204 extending proximally therefrom, the wall 204 delineating a holding space 206 in the pod 200 in which a portion of the tube 100 containing the biological sample 102 may reside, thus forming a basket like member as illustrated. In alternate embodiments, the pod would not include a flange and would therefore be fully inserted into the tube 100 as shown for example in the embodiment of FIG. 1. The illustrated embodiments of pod 200, e.g., its base, have a circular cross section and circumferential wall 204 also has a circular cross section. However, this is provided by way of example as the circumferential wall (and the pod itself, e.g., the base 201) may have a different shape such as a polygonal cross section of circumferential wall 208, as illustrated in FIG. 2c. Circumferential wall 204 could be for example a rectangular circumferential wall, a square circumferential wall, a pentagonal circumferential wall or any other basic/classic cross sections of circumferential wall. It could also be non-basic/non-classic shapes or asymmetric. Thus, as can be appreciated, various shapes of the pod and circumferential wall are contemplated and are applicable to any of the embodiments described herein. Thus, the pods and circumferential wall can comprise any of the aforementioned cross sections or other shapes/configurations if applicable.

A cut in perforated element (member) 110 is illustrated in FIG. 2b, wherein the cut exposes longitudinal cuts 202a in three orifices 202. The longitudinal cuts illustrate that orifices 202 actually cross perforated element 110, i.e., extend through the thickness 205 (height), thereby allowing passage across the perforated element of particles whose diameter (dimension) is smaller than the diameter (dimension) of the perforations. In FIGS. 2a and 2b, the perforations extend through the base 201 which in some embodiments is solid except for the perforations. In some embodiments, e.g., when a mesh is utilized, the perforated element e.g., the mesh itself, can form the base.

Figure 2D:
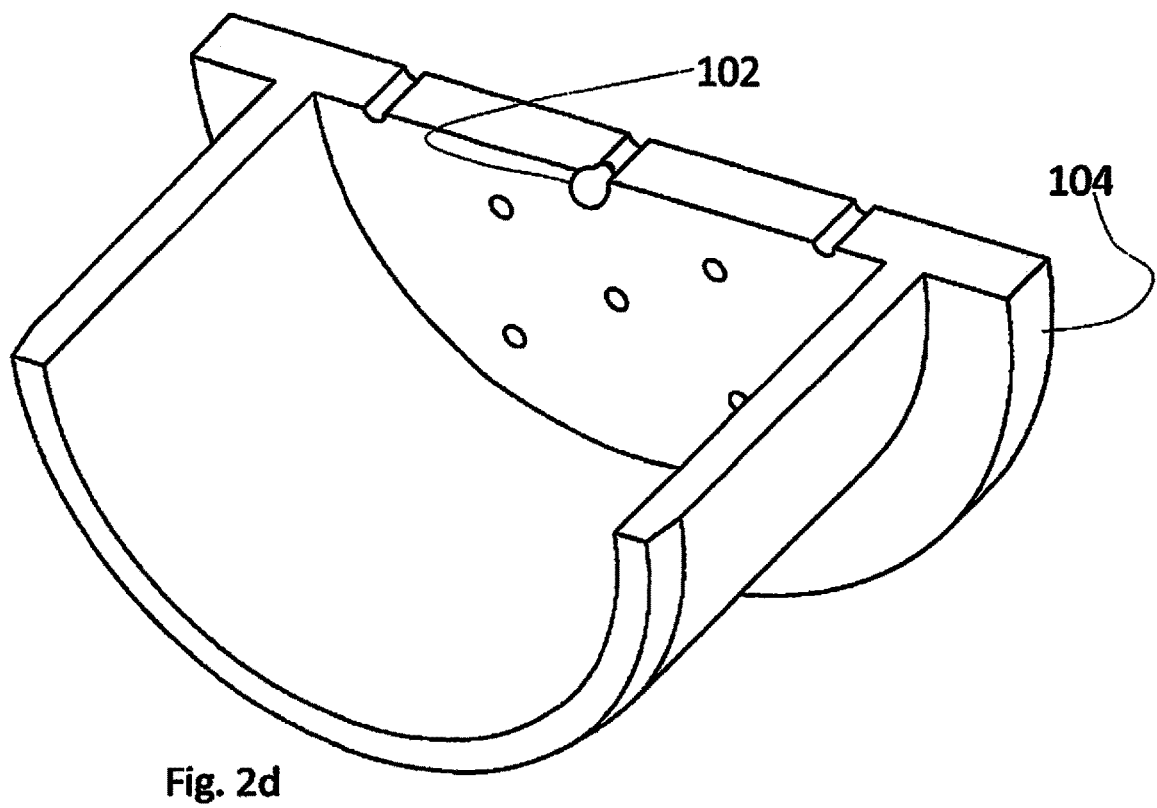
FIG. 2d is a cutaway view of the pod of FIG. 2a illustrating a biological sample in a longitudinal cut of an orifice formed in the pod.
Figure 2E:
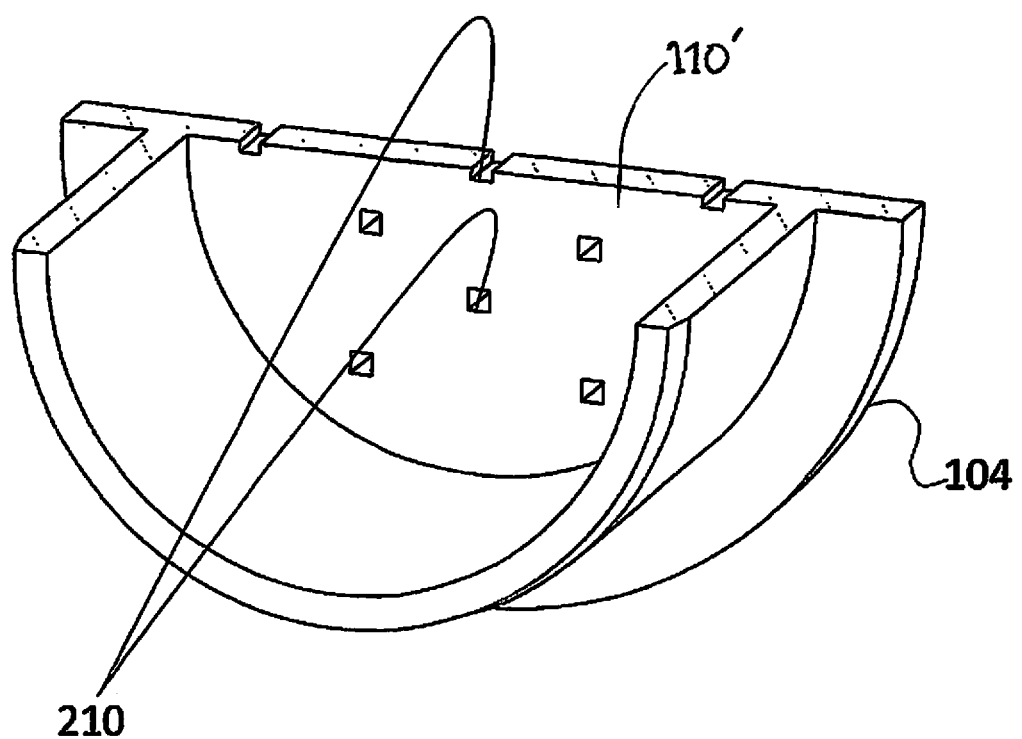
FIGS. 2e and 2f are perspective views of another alternate embodiment of a pod of the present invention with FIG. 2e showing a cutaway view and FIG. 2f showing the entire pod.
Figure 2F:
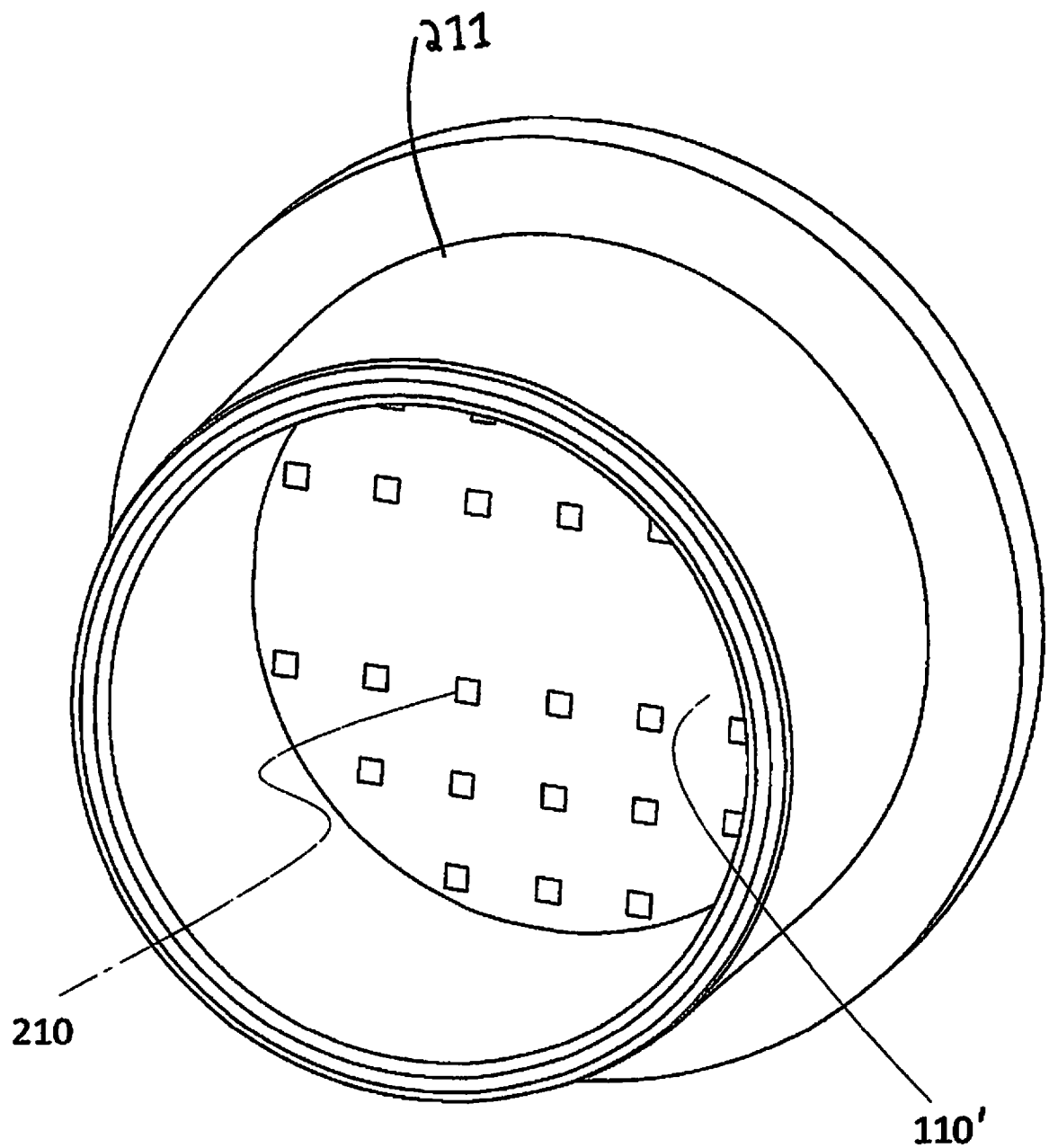

FIGS. 2a, 2b and 2c illustrate orifices 202 with circular cross sections. As discussed above, this is just one example of orifices as other forms/shapes/configurations of orifices may be used if applicable. For example, it should be appreciated that under certain conditions, such as negative pressure, biological samples 102, such as oocytes, may be pulled, inside holding space 206 (or holding space 206' of FIG. 2c), towards perforated element 110. Under such conditions the biological sample may tend to penetrate the orifices, e.g., as illustrated in FIG. 2d. One object of the present invention in some embodiments is to improve sample recovery rates further to thawing or warming the sample after cryopreservation, however, such penetration of the sample into an orifice deteriorates its survival and recovery rates. Therefore, for certain applications, it may be desirable to provide alternative orifice configurations as described above. One such alternative configuration is illustrated in FIGS. 2e and 2f, where the orifices 210 have a square (or substantially square) cross section. In certain applications, the square cross section reduces the tendency of the biological sample to penetrate into the orifice. FIG. 2f is a drawing of the entire pod 211 of FIG. 2e having perforated element 110' with square orifices 210. Note perforated element 110' is identical to perforated element 110 except for the shape of the orifices, and can be a membrane, mesh or other material as discussed above in conjunction with perforated element 110.

As noted above, it should be appreciated that the forms/shapes of orifices described thus far (e.g., round and square) are non-limiting and other orifices having different forms and shapes (e.g., non-circular, non-rectangular, etc.) may be provided. For example, an orifice may be a slit through which capillary flow may occur.

Figure 2G:
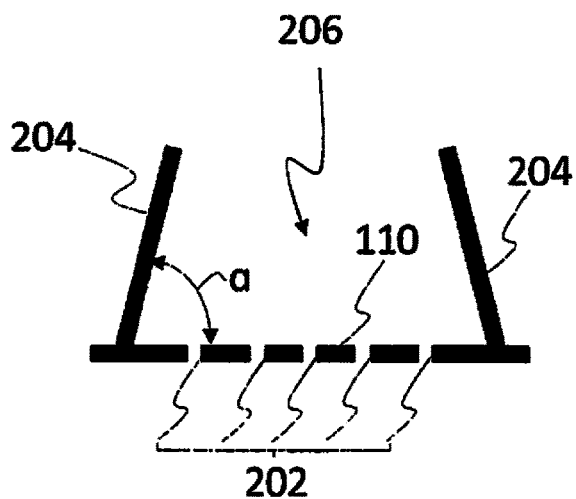
FIGS. 2g, 2h, 2i, 2j and 2k schematically illustrate two-dimensional representations of alternate embodiments of pods of the present invention.
Figure 2H:
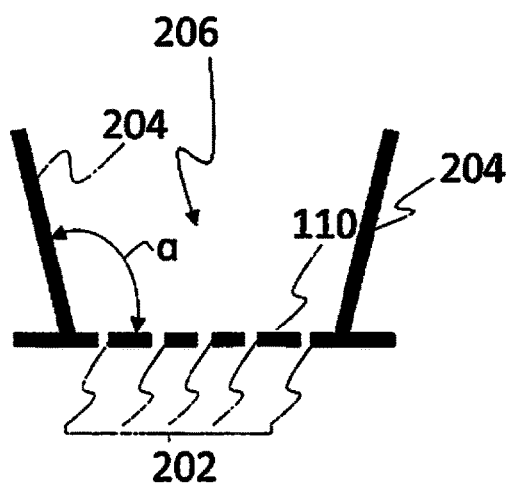
Figure 2I:
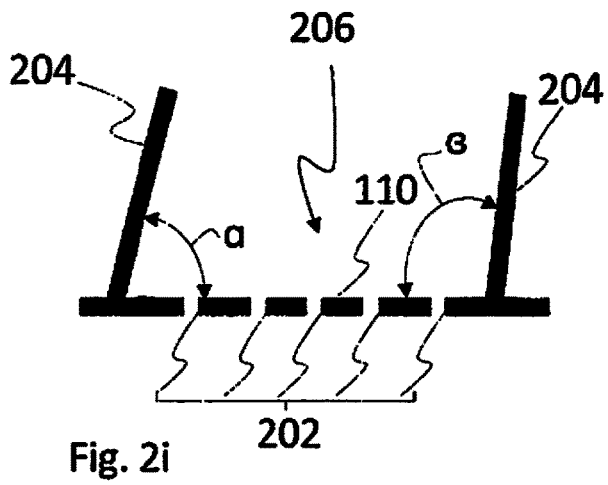

In the embodiments depicted in FIGS. 2a-2f, the circumferential walls of the pods are perpendicular or substantially perpendicular to the perforated element (and the base 201) meaning that the two surfaces (the perforated element and the walls) meet at a right angle (90 degrees) or a substantially right angle meaning for example a deviation of about 1 to about 3 degrees, e.g., due to minor shape distortions. It is noted that perpendicularity or substantial perpendicularity is non-limiting and in other embodiments the perforated element and the walls may meet at an angle wider (larger) or narrower (smaller) than 90 degrees. Moreover, the angle may change along the walls. The meeting angle α of the perforated element and the circumferential wall 204 is measured inside the pod's holding space 206 and is marked as angle α (a). In those cases where the angle of the circumferential wall changes along the lines there would be at least one position along the walls wherein the meeting angle, marked as 3, would be different than angle a, i.e., β≠α. Accordingly, FIGS. 2g, 2h and 2i schematically illustrate two-dimensional representations of pods, according to embodiments of the invention, with different angling circumferential walls 204, wherein in FIG. 2g α<90 degrees such as about 80 degrees; in FIG. 2h α>90 degrees, such as about 100 degrees; and in FIG. 2i α≠β such that a is about 80 degrees and β is about 95 degrees. As can be appreciated, these dimensions are provided by way of example for illustrative purposes and other angles are also contemplated.

Measuring the meeting angles α and β inside the pod's holding space is a matter of convention, however, in some embodiments, the angles are measured externally to the holding space.

It is possible to select any point along the upper rim of the circumferential wall and draw on the circumferential wall the shortest line from the selected point to the perforated element (base). Such a line constitutes a "height". In the embodiments described so far with reference to FIGS. 2a-2i, the heights are straight lines. In some embodiments, the circumferential walls of the pod may be bent or curved instead of straight. One example of a bent circumferential wall is shown in FIG. 2k, wherein the walls bend towards the center, i.e., toward a longitudinal axis of the pod, as they extend proximally in a direction away from the perforated element (base). Other bends or nonlinear walls are also contemplated.

Figure 2J:
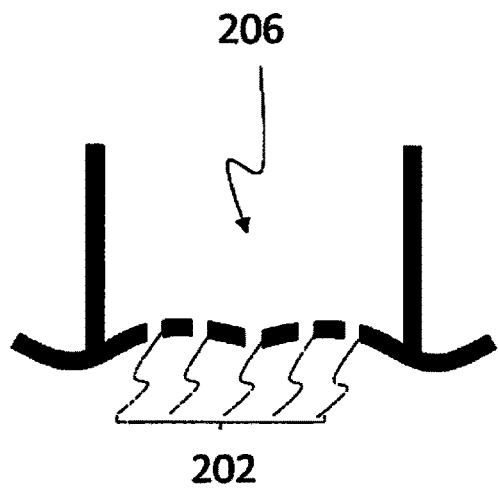
Figure 2K:
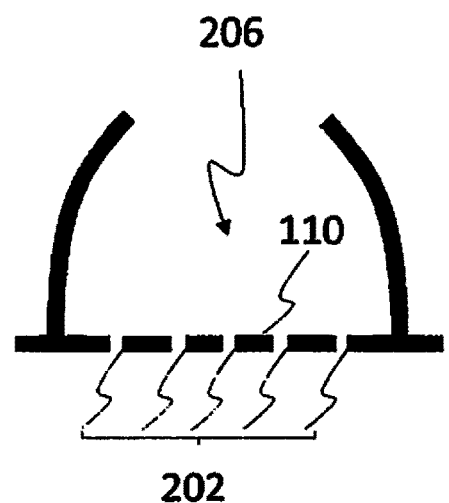

It should be appreciated that in some embodiments, e.g., as illustrated in FIG. 2j, the perforated element may form a non-planar base. The non-planar base can have arcuate portions or linear portions lying in different planes. FIG. 2j provides an example where the perforated element has curved surfaces.

It should be appreciated that any combinations of the features of the aforementioned embodiments can be provided. That is, any of the foregoing alternative shape of the orifices, shape of the circumferential wall, angle of the circumferential wall, linear or non-linear feature of the circumferential wall, and/or planar or non-planar feature of the perforated element or base, etc., can be selected/utilized to form the pod. By way of example, the circular walls of FIG. 2a can be combined with the square orifices of FIG. 2e and/or the non-planar perforated element of FIG. 2j. By way of another example, the polygonal wall of FIG. 2C can be angled as in FIG. 2g. Any other combination may apply as well, including a circumferential wall having different shapes for its side facing the holding space and the outer side.

The circumferential wall of the pod in some embodiments has an inner diameter of about 1.4 mm to about 5.7 mm, and an outer diameter of about 1.5 mm to about 5.8 mm. In preferred embodiments, the circumferential wall has a thickness of about 0.1 mm to provide a thin wall to provide very high heat transfer during cooling and warming. Note that these dimensions are provided by way of example as other dimensions to achieve the functions of the pod described herein are also contemplated. The dimensions of the pod 200 and the tube 100 are related for the reasons described below for coupling these two components, i.e., placing one inside the other. The pod can be made of various materials, and one contemplated material is polycarbonate.

It should be appreciated that generally the pod can be considered comprising a vessel (or vessel portion) and a holding space. The vessel, according to some embodiments, comprises the circumferential wall (and the base or flange if provided) and the perforated element. The vessel comprises at least one opening at its proximal end into the holding space and a plurality of orifices at its distal end communicating with the holding space. In some embodiments, the size of the proximal opening into the holding space is defined by the internal diameter of the circumferential wall.

The pod 200 can be coupled to the tube 100/capillary duct, such as capillary duct 108 of capillary device 100 of FIG. 1. That is, the capillary duct and the pod are structurally couplable/connectable. For example, FIGS. 3a-3c illustrate coupling of pod 200 of FIG. 2a with tube 100/capillary duct 108 of FIG. 1 by way of example. The pod and tube of other embodiments described herein can be coupled in the same manner. Note the pod 200 and capillary duct 108 are shown as cutaway views in FIGS. 3*a*-3*c* for ease of explanation. The distal end 104 of the capillary duct 108 which has a distal opening approaches the circumferential wall 204 of pod 200. In order to couple the pod with the capillary duct, the external form of circumferential wall 204 adapts/conforms to the internal form of the capillary duct at and close to the duct's distal opening, similar to the adaptation of a key to a keyhole. In FIG. 3*a*, the capillary duct 108 is approaching the proximal end of the pod 200 at the opening in the circumferential wall 204 to the internal space; in FIG. 3*b* the capillary duct 108 further approaches the circumferential wall and is shown positioned partially over the circumferential wall 204 of pod 200. In FIG. 3*c* the capillary duct 108 is fully inserted over the circumferential wall 204, abutting base 201. Coupling is achieved when the pod 200 and tube 100 are locked/secured together, i.e., the pod 100 locks the capillary duct 108 and/or vice versa (i.e., the capillary duct 108 locks the pod 100). In some embodiments the locking is achieved by the frictional engagement of the two components due to the outer diameter of the circumferential wall 204 of pod 200 closely matching, but slightly less than, the internal wall diameter of the tube 100. The frictional engagement can be enhanced by shrinkage at low temperatures to provide an increased pressure coupling as described in detail below. As a result of the coupling, the holding space of the pod 200 and the capillary space of the capillary duct 108 together form a preparation space in which a liquid column may be formed. In some embodiments, the pod can be manufactured with the capillary duct as a single unit wherein the sample may be loaded into the preparation space, e.g., from the proximal end of the capillary duct/space. As shown, the capillary duct 108 is moved into engagement with the pod 200, however, it is also contemplated that the pod 200 is moved into engagement with the capillary duct 108 or both are moved toward each other into engagement for coupling. The capillarity of the tube (straw) enables the media (solution) discussed below to flow through the openings, e.g., mesh, of the pod via capillary action.

Alternative ways to couple the pod and tube (capillary duct) are also contemplated. For example, instead of coupling the capillary duct to the pod by pressure or by frictional engagement, they can be provided with a respective internal and external screw thread so they can be attached by screwing the components together.

In accordance with another alternate embodiment, the pod and tubes can be configured so that the capillary duct (tube) 108 fits into the pod 200 and is secured by pressure or frictional engagement rather than the pod fitting into the capillary duct as shown in FIGS. 3*a*-3*c*. In such embodiments, the internal diameter of the pod 200 would be close to, but slightly greater than, the external diameter of the capillary duct 108 so that the pod 200 would be fitted over, i.e., external to, the capillary duct 108 and retained for example by a frictional fit. Thus, in this alternate embodiment, they can be coupled by pressure or a frictional fit as the capillary duct fits into the pod, and such coupling can be utilized with any of the pod and tube embodiments disclosed herein. Alternatively, they can be retained by being screwed together in embodiments wherein an external thread is provided on the tube 100 and an internal thread is provided on the circumferential wall of the pod 200, other alternative ways to couple the two components (members) can be utilized, as long as the result is a preparation space obtained by coupling a pod with a perforated element to the tube, e.g., capillary duct.

In the embodiments wherein the pod fits into the capillary duct (tube) or the capillary duct (tube) fits into the pod, it should be appreciated that there is an element (component or member) that is a hugged internal element and an element (component or member) that is a hugging (external) element (component or member). When the pod fits into the capillary duct, it is the capillary duct that is external and hugs the pod as the pod is internal and being hugged by the duct. Conversely, when the capillary duct fits into the pod, the pod is the external hugging element while the duct is the internal hugged element. It is known that in low temperature, different materials display different degrees of shrinkage. Therefore, in order to prevent disintegration of the duct-pod (tube-pod) connection in low temperature settings, the hugging element needs to be made of material with higher shrinking coefficient compared to the hugged element. For example, if the capillary duct is the hugging element which is manufactured of polypropylene, the pod can be made of polycarbonate. Other materials are also contemplated to ensure that the internal hugged element does not shrink to a greater degree than the external hugging element which could loosen or disengage the coupling which was formed by a tight fit between the two components. Also, this shrinkage characteristic can be used to provide a pressure fit as the external component would shrink to further hug (clamp) the internal component. Note the pressure fit can be provided to enhance the frictional engagement or relied on for coupling without the frictional engagement.

Methods for using the devices of the present invention for cryopreservation of a biological sample will now be described. The methods described herein advantageously enable multiple samples, e.g., eggs, if desired, to be retained in the pod and placed in solutions as a group rather than requiring individual samples, e.g., eggs, to be moved one by one into the various solutions. Additionally, due to the coupling of the tube and pod, a larger number of biological samples can advantageously be retained by the tube. The procedure provides a simple, fast and efficient method of cryopreservation. Note the method of the present invention can also be used for a single biological sample.

It should be appreciated that due to capillarity, when the distal end of the capillary duct (such as distal end 104 of capillary duct (tube) 108 in FIG. 1 and distal end of the pod attached to the capillary duct 108) is immersed in a liquid, the capillary space will draw the liquid up (toward the proximal end 106 if the proximal end is open), giving rise to a liquid column. Herein the term "immersing" means bringing the distal end in touch with a liquid, so as to allow capillary action to build a liquid column in the capillary duct. On the other hand, it is also possible to drain liquids from within the capillary space of the capillary duct. Draining can be done for example by bringing the distal end in touch with a material having adhesion which is strong enough to overcome the adhesion forces operating in the capillary space to hold the liquid column to drain the liquid out the distal end. For example, it is possible to drain the liquid with a blotting paper or even with an absorbent cottonwool or cotton. Alternatively, instead of draining the capillary duct with an absorbent material, it is possible to push the liquid out of the capillary duct distal end by using, for example, a pump coupled to the duct's proximal end such as the manual or other pumps described herein. Thus, the distal end of the pod with the openings, e.g., mesh, is placed in touch with the material. In some embodiments, the location in the distal tip of the straw allows evacuation of all the solution to less than 1 microliter.

Figure 4:
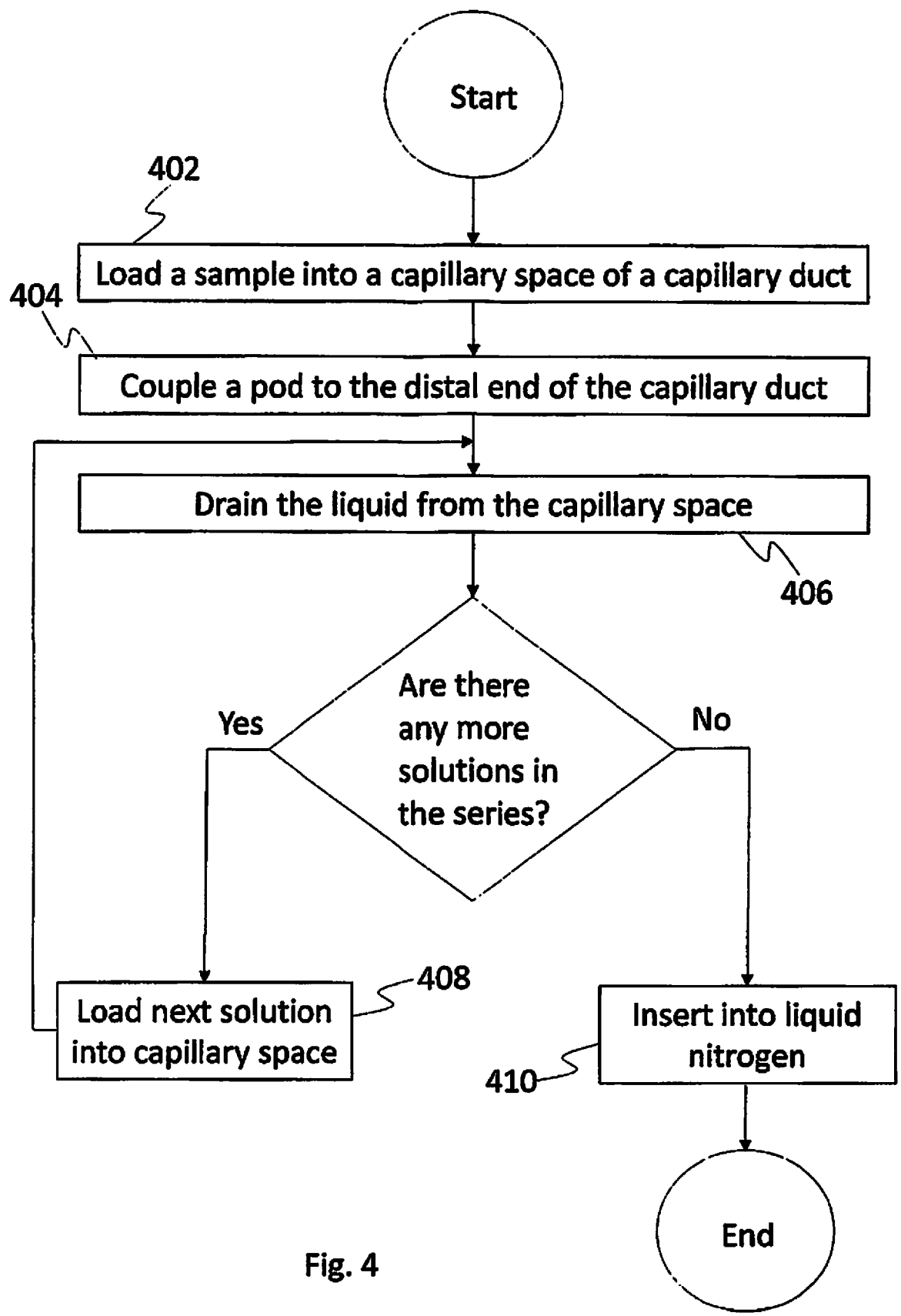
FIG. 4 is a flowchart illustrating procedures taken to prepare a sample for vitrification in accordance with one embodiment of the present invention.

It has been explained above that the biological sample can be loaded into the capillary duct, for example, by capillary action. In addition, it is known in the art that the process of vitrification involves changes of solutions in which the sample should be submerged. FIG. 4 presents a flowchart illustrating procedures taken in order to prepare a sample for vitrification, according to one method of the present invention. Thus, the system and method of utilizing the device (coupled pod and tube) can be appreciated with reference to the flow chart of FIG. 4. The method refers to use of the tube 100 of FIG. 1 and the pod 200 of FIG. 2a, it being understood, however, that other embodiments of the tube and pods can be utilized and the method of FIG. 4 is fully applicable to these other embodiments.

In step/box 402, a sample is loaded into a capillary space of a capillary duct (e.g., duct 108 of tube 100 of FIG. 1). As was previously explained, loading into the duct can be done, for example, by capillary action or by using a pump such as pump 112 of FIG. 1. It should be noted that immediately after loading into the capillary duct 108, the sample resides inside the capillary space, submerged in a liquid that is similar to the liquid in which it was submerged prior to loading. Hence, for example, had the sample been stored in a holding medium prior to loading, then immediately after loading the sample would be submerged in the holding medium inside the capillary space. Note the method as described herein refers to "the capillary duct" for convenience as way of example, it being understood that this refers to the internal lumen or "duct" of the tube 100 which exhibits capillarity. Thus, if a pump is used, the sample would be submerged in the holding medium in the duct or lumen of the tube as used herein, if the tube is not so configured to achieve a capillary effect. Consequently, unless otherwise noted, the method of FIG. 4 and FIG. 6 (and FIG. 14) would be applicable to a non-capillary duct, except for the first step where the sample would be loaded into the tube in another way.

In step 404, a pod, such as pod 200, is coupled to the distal end of the capillary duct, such as duct 108. Coupling is performed by the ways described herein, such as by applying pressure (see FIGS. 3a-3c), by screwing, etc. Note the perforated member 110 of the pod 200 prevents the sample from unintentionally running out of the capillary space through the distal end of the capillary duct.

It is understood by those versed in the art of vitrification that in order to prepare a biological sample for vitrification the sample needs to be submerged in a series of solutions that gradually replace the water that naturally resides in the sample with cryoprotectants. In the example of vitrification, these are known as a holding medium (HM), equilibration solution (ES) and vitrification solution (VS). For example, a holding medium can be buffer solution supplement with proteins, an equilibration solution could be 7.5V/V Dimethyl sulfoxide (DMSO), 7.5% V/V Ethylene glycol (EG) and 20% fetal calf serum (FCS) in buffer solution. Avitrification solution can be 15% V/V DMSO, 15% V/V EG, 0.5M sucrose and 20% fetal calf serum (FCS) in buffer solution. Accordingly, for each solution in the series, the liquid within the capillary space is drained (step 406), e.g. by touching with the distal end on a blotting paper, filter paper, absorbent cottonwool or cotton etc., as was previously explained, and in step 408 the next solution in the series is loaded into the capillary space by immersing the distal end therein. The liquid can flow from a distal end of the pod through the pod in a proximal direction and into the straw. After the last solution is drained in step 406 the capillary duct can be inserted in step 410 into e.g., liquid nitrogen, liquid nitrogen slush or liquid air for cryopreservation. Capillary force if provided can keep the solution within the straw. Note in some embodiments before plunging the straw into liquid nitrogen the solution can be evacuated. In some embodiments, when ready for use, the straw and pod are removed from the liquid nitrogen, the eggs are moved proximally back into the straw such as by aspiration and the straw is cut proximal of the pod to separate the pod.

Therefore, embodiments of the invention disclose a device (such as device 100) that is configured to treat the biological sample with a series of solutions. The series may comprise any applicable number (n) of solutions, such that n=1, n=2, n=3, n=4, n=5, 5=6, n=7, n=8, n=9, n=10, or any other applicable number of solutions as appropriate to the case.

In addition, it should be understood that the flowchart of FIG. 4 is disclosed by way of example only, and other embodiments may exist. For example, the device comprising tube (straw) 100 of FIG. 1, with any applicable pod (see, e.g., FIGS. 2a to 2k), is configured to be used for preparation of a biological sample for cryopreservation as well as for cryopreservation itself, as it can be inserted into liquid nitrogen. However, alternative methods to those presented in FIG. 4 may skip step 410 ("insert into liquid nitrogen"). Instead of cryopreserving the sample while inside the device, it is possible to extract it from the capillary space, transfer it to another container or tool for insertion into liquid nitrogen, i.e., by placing them on a cryo-carrier such as, for example, Cryotop®, Cryotech, Cryoleaf®, Cryolock™, Rapid-i™, Vitrifit, a Cryo Bio System (CBS) carrier, etc.

Further to understanding the embodiments described so far, it can be appreciated that solutions can be loaded into the capillary space by additional or alternative ways to capillarity action. For example, according to some embodiments it is possible to connect a pump to the proximal end of the capillary duct such as pump 106 of FIG. 1, thus pumping the solution into the capillary duct instead of letting it flow in by capillary action alone. Moreover, understanding that the solution (or generally, the liquid) flows into the capillary duct by the force affected by the pump, it can be appreciated that in some embodiments the capillary duct is not capillary anymore. That is, embodiments of the invention comprise a "straw" or a "tube", wherein a "capillary duct" is a specific case (version) of a straw or tube. Similarly, a "straw space" or "tube space" is the space inside the straw or tube, while "capillary space" is a specific case (version) of a straw space or tube space that exhibits capillarity.

It is noted that all the embodiments previously presented with reference to devices comprising a capillary duct apply also to devices comprising a straw or tube that does not have/utilize a capillary duct. This includes also the various embodiments of the pods which can be coupled to the straw or tube. Accordingly, the embodiments presented with reference to FIGS. 1, 2a to 2k and 3 also apply to a non-capillary straw or tube.

Figure 5:
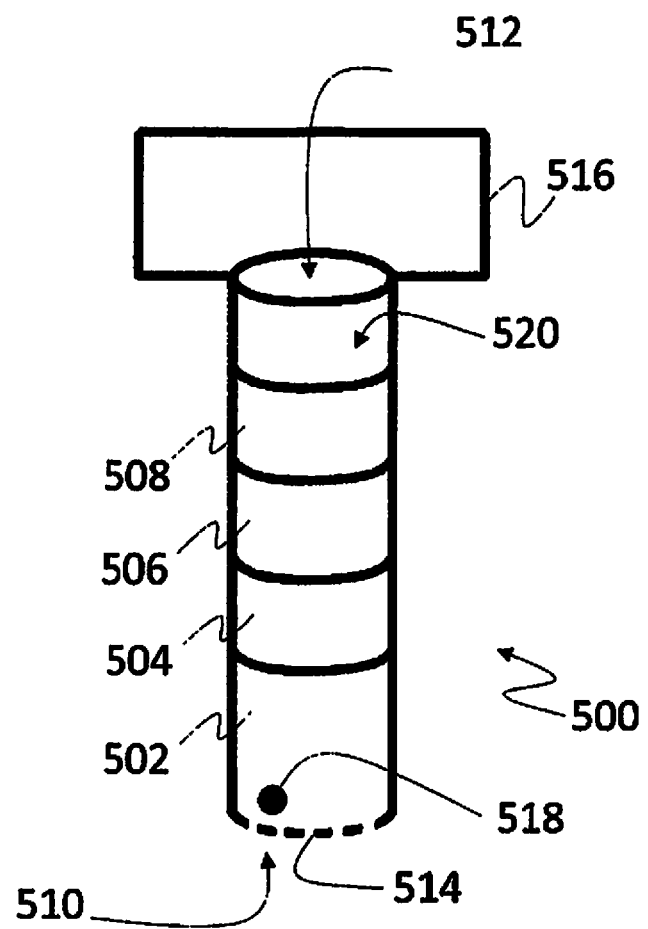
FIG. 5 is a side view of a tube (e.g., straw) of the present invention having four different layers of liquid therein in accordance with the present invention.

According to a method that is an alternative to the method of FIG. 4, it may not be required to drain the liquid from the straw space prior to loading the next liquid therein. This could be applicable when a pump is coupled to a straw or tube in order to draw liquid into the straw space or tube space. In certain embodiments, the second liquid (for example, equilibration solutions) has a density that is higher than the density of the first liquid (for example, holding medium), the third liquid (such as vitrification solution) has a higher density compared to the second liquid and so forth (series has higher density compared to its preceding density, in other words, it is heavier). It may be understood that having a layer of a solution above a layer of previous solution in the straw space would not result in mixing thereof, at least not without investment of additional energy, such as by mixing. In other words, liquids of successive increased densities are sequentially/progressively inserted into the straw (tube) and do not mix. FIG. 5 illustrates a straw (tube) 500, similar to straw (tube) 100, having four different layers therein, marked as 502, 504, 506 and 508. As noted above, element 500 is in the form of a tube and is explained herein as constituting a straw, a type of tube. The straw distal end is labeled with reference numeral 510 and the straw proximal end is labeled with reference numeral 512. In the distal end there is a perforated member 514 that can be, for example, the perforated member of any one of the pods described with reference to FIGS. 2a-2k. Straw 500 can be capillary or not capillary, as applicable to the case as described above. It can be appreciated that layer 502 is the heaviest solution (in terms of density), 504 is lighter, 506 is even lighter, and the lightest is solution 508. A pump 516, shown schematically, can be disposed (coupled) at the proximal end 512 and can be in any of the forms described above and functions as described above. Reference numeral 518 represents a biological sample contained within the straw 500 and reference numeral 520 represents the straw space, e.g. lumen within the straw 500.

Note in FIG. 5 and FIGS. 7a-8c, a version of the pod is shown which does not have the flange (lip/base) so it is fully contained within the straw 500. Clearly, pods with flanges could also be utilized in which the flange protrudes from a distal end of the straw as in FIG. 3C.

Figure 6:
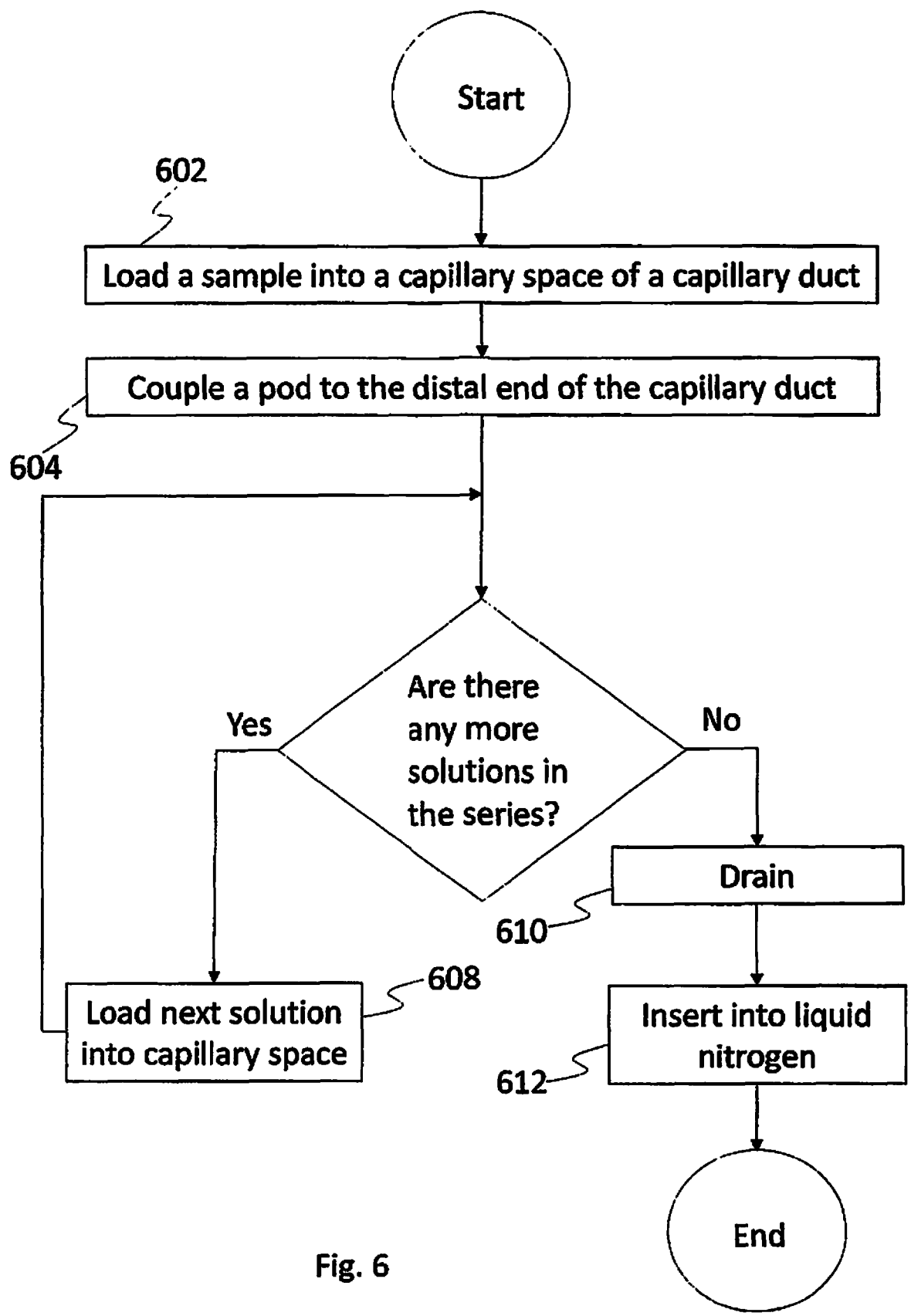
FIG. 6 is a flowchart illustrating procedures taken in order to prepare a sample for vitrification in accordance with an alternate embodiment of the present invention.

FIG. 6 is a flowchart illustrating procedures taken in order to prepare a sample for vitrification, according to an alternate embodiment of the invention which does not require draining as in FIG. 4. That is, the method of FIG. 6 resembles the method of FIG. 4, except no draining is performed among the loadings of the different solutions. In step/box 602, a sample 502 is loaded into a capillary space, i.e., a straw space 520 of an empty straw (capillary duct/tube) (e.g. 100 or 500). As was previously explained, loading can be done, for example, by capillary action in a capillary duct or by using a pump (such as pump 112 or 516 or alternative pumps described herein). It should be noted that immediately after loading, the sample resides inside the straw space (duct), submerged in a liquid that is similar to the liquid in which it was submerged prior to loading. Hence, for example, had the sample been stored in a holding medium prior to loading, then immediately after loading preferably there would be a sample submerged in the holding medium inside the straw. This is also the case in the method of FIG. 4.

In step 604 a pod is coupled to the distal end of the capillary duct (straw/tube). Coupling is performed by any way applicable to the case, such as by friction, applying pressure (see e.g., FIGS. 3a-3c), screwing etc., or alternate methods. The perforated member of the pod would prevent the sample from unintentional running out of the capillary space via the distal end of the capillary duct.

As noted above, it is understood by those versed in the art of vitrification that in order to prepare a biological sample for vitrification the sample needs to be submerged in a series of solutions, with the densities of the solutions increasing as the preparation advances, because the concentration of cryoprotectants increases. Accordingly, for each solution in the series, in step 608 the next solution in the series is loaded into the capillary space by immersing the distal end therein and in some embodiments by operating the pump. Finally, all the layers are drained in step 610 and the straw can be inserted in step 612 into liquid nitrogen, liquid nitrogen slush or liquid air for cryopreservation.

FIGS. 7a, 7b and 7c illustrate stages of loading the straw 500 of FIG. 5, according to the method set forth in the flow chart of FIG. 6 (and FIG. 4). The same stages may occur with the capillary duct of tube 100 of FIG. 1 having a capillary effect or other tubes when it has a pump coupled thereto to pump liquid. In FIG. 7a, the first layer 508 is loaded with the biological sample 518. In the described example of preparing the sample for vitrification, the first layer may be of a holding medium. Then, in FIG. 7B, a second layer 506 is loaded as well which can be achieved by placement of the pod in the solution. Layer 506 in the example is a holding solution whose density is higher than that of the holding medium and hence layer 508 is "pushed up" thereby (moved proximally) and layer 506 appears below (distal of layer 508). It is advised to avoid shaking the straw, or the layers may mix. In addition, the biological sample gradually absorbs the holding solution, which replaces the holding medium that has been there before. This turns the sample heavier and therefore it sinks from layer 508 to layer 506, moving toward the bottom of the straw (at the distal end). Thereafter, because there are other unloaded solutions in the series, the process repeats itself as the straw and pod are moved to another solution and layer 504 is loaded into the straw, as illustrated in FIG. 7c. Layer 504 may be an equilibrium solution. It is heavier than the holding solution of layer 506, and therefore layers 506 and 508 are pushed up (proximally) and layer 504 resides therebelow. Sample 518, which absorbs the equilibrium solution, further sinks to layer 504, moving to the distal end. Finally, a fourth solution (such as a vitrification solution) in the present example is loaded, and this yields FIG. 5, wherein layer 502 comprises the fourth, heaviest solution and biological sample 518 sinks again to the distal end (bottom) as it absorbs the solution. The fourth solution may be another equilibrium solution, heavier than that of layer 504.

It is noted that the description above does not intend to teach how to perform vitrification. Rather it is intended to disclose how to use the straw of the present invention in order to prepare the sample for vitrification. Therefore, the procedure described does not intend to be an accurate vitrification procedure. Further to reading the procedure described herein, a person versed in the art of vitrification will be able to apply the procedure to a known vitrification process.

Another alternate method for preparing a sample is disclosed in FIGS. 8a-8d, applicable e.g., to the method of FIG. 6, which does not necessarily require either capillarity or the usage of a pump, and utilizes the concept of communicating vessels. When a tube, open at both ends, is immersed in a container with a liquid, the liquid would fill the tube to a level similar to the level of the liquid in the container.

Figures 8A, 8B:
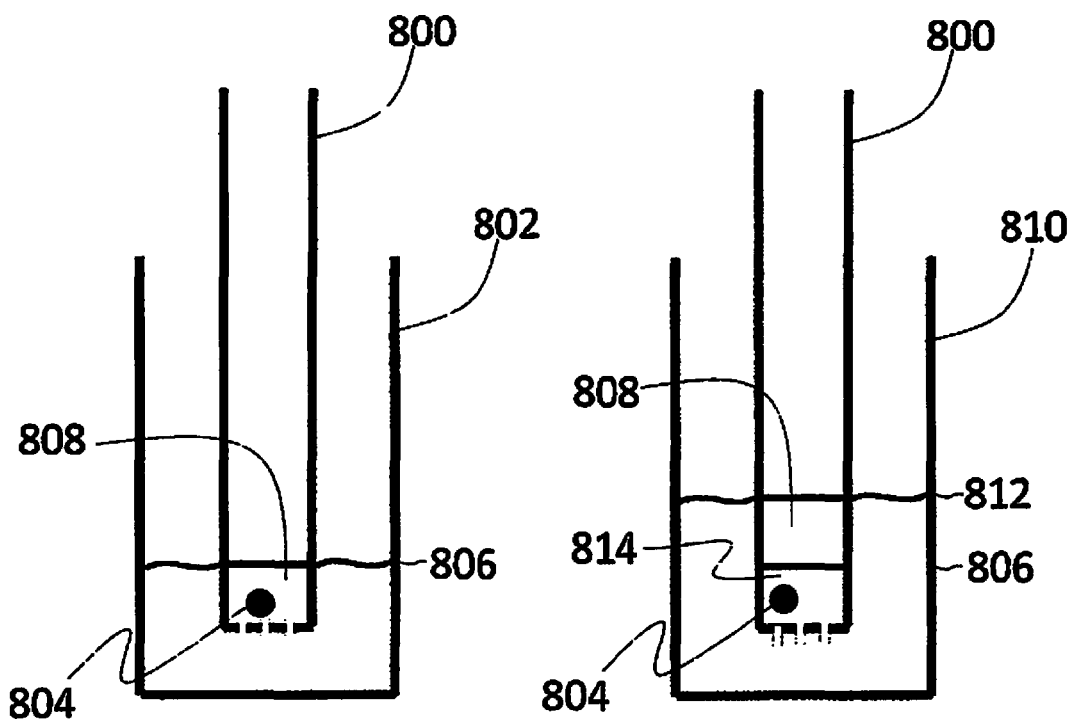
FIGS. 8a, 8b, 8c and 8d illustrate loading four solutions into a tube in accordance with another embodiment of the present invention.
Figures 8C, 8D:
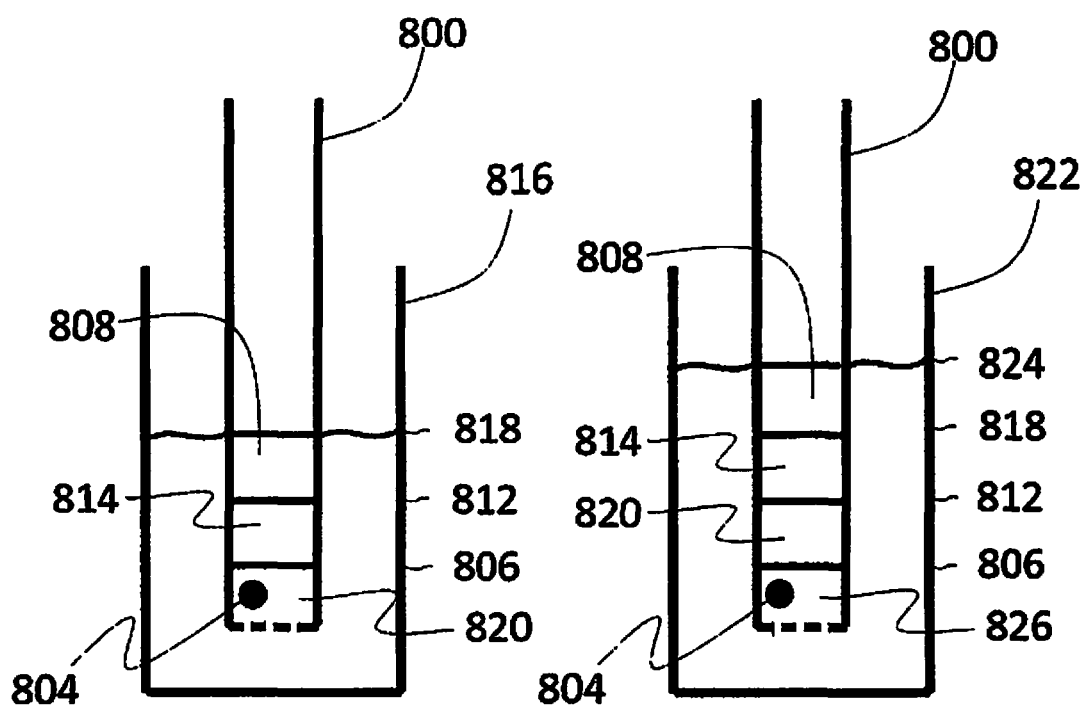

FIGS. 8a-8d illustrates loading four solutions into a straw, according to embodiments of the invention. In FIG. 8a, a straw (or tube) 800 is immersed in a first solution within a container 802 in order to load a biological sample 804 into the straw 800. Straw 800 is coupled at a distal end to a pod with a perforated member as described in the various embodiments above. The level of the solution in container 802 is marked by line 806. If the procedure is for preparation of a biological sample for vitrification, the first solution may be a holding medium in which the biological sample resides. In order to load the sample into the straw 800, a pump can be coupled to the proximal end thereof, and possibly disconnected after the loading. The pump is not illustrated in FIGS. 8a-8d but as can be appreciated could for example resemble the manual pump 112 of FIG. 1 such as a bulb or an electric pump or another pump can be used.

As can be seen in FIG. 8a, inside straw 800 there is obtained a layer 808 of the first solution, whose level is similar to the level of the solution in the container 802. Thereafter, the straw 800 can be removed from the first container 802 and transferred to a second container 810, holding a second solution, heavier than the first solution, whose level in the container, marked as 812, is higher than level 806 of the first solution in container 802. In response, the lighter layer 808 would be pushed up so as to equalize level with the liquid level 812, wherein a new layer 814, of the second solution, would reside therebelow (distal of layer 808). In addition, it is illustrated in the figure that biological sample 814 would sink from layer 808 to layer 814, as was previously explained with reference to FIGS. 7a-7c. Therefore, biological sample 814 is being treated by the second solution in the straw space.

It is noted that upon transferring straw 800 from container 802 to container 810, layer 808 of the first solution should be kept inside. If the straw is narrow enough to maintain capillarity, the layer will be kept inside. However, if the straw does not maintain capillarity, it may be required to seal its proximal end during the transfer, thus preventing loss of layer 808. This is relevant to any transfer of the straw 800 between one container to another. In small straws, for example 0.25 ml or 0.5 ml, a seal might not be necessary. In larger straws it can be blocked with a finger at the end if a seal is desired.

Subsequently, straw 800 is removed from container 810 and transferred to container 816, holding an even heavier third solution, whose level 818 is higher than level 812 of the second solution in container 810. Again, the two previous layers (808 and 814) are pushed up (proximally) by the third solution to equalize the level inside the straw to level 818 of the third solution. Thus, layer 820 of the third solution is created below (distal of) layers 808 and 814, while sample 804 sinks thereto into the layer 820. Therefore, biological sample 814 is being treated by the third solution in the straw space.

Finally in the present example, straw 800 is transferred from container 816 to container 822, holding a fourth, heaviest solution, whose level in the container, marked as 824, is higher than level 818 of the third solution in container 816. In response, layers 808, 814 and 820 are pushed up (proximally) by the fourth solution to equalize the level inside straw 800 to level 824 of the fourth solution. Thus, layer 826 of the fourth solution is created below (distal of) layers 808, 814 and 820, while sample 804 further sinks thereto into layer 826. Therefore, biological sample 814 is being treated by the fourth solution in the straw space.

It should be understood that the invention is not limited to four layers of four solutions, and the four layers of the various methods are provided by way of example. The number of layers and solutions may vary as required, and it can be for example one layer and solution, two layers and solutions, three layers and solutions, four layers and solutions, five layers and solutions, six layers and solutions, seven layers and solutions, eight layers and solutions, nine layers and solutions, ten layers and solutions, or any other number of layers and solutions applicable to the case. Generally, the device is configured to treat the biological sample with a series of solutions whose density increases gradually or gradually gets heavier. This progressive increase moves the previous layer upwardly (proximally) within the straw as the sample sinks to the lowest higher density level.

In addition, in the Figures, containers 802, 810, 816 and 822 are shown schematically as similar containers. However, due to the communicating vessels concept, the level of liquid in the straw would become the same as the level of liquid in the container where it is immersed, regardless of the shape and volume of the containers. Thus, different shape containers with different volumes can be utilized.

Moreover, while in the example the level of the solution in the containers gets higher as the process advances, it should be understood that this is required. Instead, it is possible to keep the level constant or even lower it, as long as the straw is immersed deeper and deeper in the solution. Thus, any manipulation allowing rise of the level of solution in the straw space in accordance with the communicating vessels concept may be applied, including combinations (e.g., for the second layer increase the volume, for the third layer immerse deeper, etc., as applicable to the case).

Further to understanding how the communicating vessels concept can be applied by some embodiments of the invention, other embodiments are described. In these embodiments, it is possible to fill the straw space with a layer of solution, then close the proximal end of the straw space. Next, if the straw is transferred to another solution (or if the solution in the container changes to another solution), it should be appreciated that the composition of the solution in the layer, or at least in its bottom, near the distal end, will gradually change by diffusion.

While embodiments presented so far referred to gradually increasing densities, it should be appreciated that this is not always the case and sometimes the densities may be gradually decreased instead of increased. One such example is while warming or thawing a vitrified biological sample. In such an example, there is a need to gradually reduce the concentration of cryoprotectants around and within the sample. In some embodiments, a high concentration of sucrose (e.g., a 1M, 1 Molar sucrose solution) is used to dilute the vitrification solution in the straw space, thereby diluting the vitrification solution. Thereafter, the solution is further diluted by a lower concentration sucrose solution, such as 0.5M and so on. Thus, the devices and methods described herein can also be utilized to warm a biological sample.

It can be understood that sometimes the densities may be decreased rather than increased in the different embodiments of the invention, i.e., those involving change of solution (see, e.g., FIG. 4), those involving diffusion of solutions, and those involving layers of solutions (see, e.g., FIGS. 5, 6, 7a-7c and 8a-8c) that is, as generally explained, the biological sample loaded into the straw space is gradually exposed to solutions having gradually changing densities. The perforated element prevents loss of the sample, while it still allows in-flow and out-flow of the solutions therethrough (solutions are kinds of liquids).

The methods described herein are conducted manually step by step. It is also contemplated, that the movement of the device into different solutions can be automated and performed by a robotic arm. The step of inserting the device into liquid nitrogen can also be performed robotically instead of manually as described above.

Although various embodiments of the invention have been described above, these are only given for the purpose of explanation of the present invention and the range of the present invention should not be considered as being limited only to these embodiments.

While the above description contains many specifics, those specifics should not be construed as limitations on the scope of the disclosure, but merely as exemplifications of preferred embodiments thereof. Those skilled in the art will envision many other possible variations that are within the scope and spirit of the disclosure as defined by the claims appended hereto.

The invention claimed is:

1. A method for performing a cryoprocedure on a biological sample comprising:
   a) loading the biological sample into a tubular member;
   b) positioning the tubular member in a first solution with the biological sample retained therein;
   c) removing the tubular member from the first solution with the biological sample retained therein; and
   d) positioning the tubular member in a second solution with the biological sample retained therein, wherein the first and second solutions have different densities, and wherein draining of said first solution prior to loading of said second solution is not performed,
   wherein the step of loading the biological sample is performed by capillary action, and wherein the sample is retained by a perforated element being configured to allow inflow of liquids to communicate with a lumen of the tubular member containing the biological sample, wherein the perforated element is positioned in a pod, and wherein said tubular member is made of a material characterized by having higher shrinking coefficient compared to the pod.

2. The method of claim 1, wherein a plurality of biological samples are loaded into the tubular member and the plurality of biological samples are together positioned in the solutions.

3. The method of claim 1, wherein the perforated element has at least one orifice, the at least one orifice having a dimension smaller than a dimension of the biological sample to prevent exit of the biological sample from the tubular member.

4. The method of claim 3, wherein the pod is configured to hold the perforated element in the tubular member, and wherein the pod is couplable to the tubular member.

* * * * *